United States Patent [19]

Herzl

[11] Patent Number: 4,747,312
[45] Date of Patent: May 31, 1988

[54] DOUBLE-LOOP CORIOLIS TYPE MASS FLOWMETER

[75] Inventor: Peter J. Herzl, Morrisville, Pa.

[73] Assignee: Fischer & Porter Co., Warminster, Pa.

[21] Appl. No.: 69,817

[22] Filed: Jul. 6, 1987

Related U.S. Application Data

[63] Continuation-in-part of Ser. No. 831,564, Feb. 21, 1986, Pat. No. 4,691,578.

[51] Int. Cl.⁴ .............................................. G01F 1/84
[52] U.S. Cl. .............................................. 73/861.38
[58] Field of Search ......................... 73/861.37, 861.38

[56] References Cited

U.S. PATENT DOCUMENTS 4,192,184  3/1980  Cox et al. ...................... 73/861.38

Primary Examiner—Herbert Goldstein
Attorney, Agent, or Firm—Michael Ebert

[57] ABSTRACT

A mass flowmeter of the Coriolis type in which the fluid to be metered is conducted through a pipe which is coiled to form a double loop. The pipe is anchored at its inlet and outlet ends and also at its center which is the junction of the two loops to define a tuning fork in which the identical loops on either side of the anchored center function as tines that are free to vibrate as well as to twist. An electromagnetic driver mounted at the vertex of the double loop is electrically energized to cause the loops to vibrate in phase opposition at the natural frequency of the tuning fork. The fluid passing through the double loop is subjected to Coriolis forces, thereby causing the vibrating loops to torsionally oscillate in accordance with the mass flow of the fluid. Capacitance sensors are symmetrically mounted on the respective loops to yield signals having a difference in magnitude and phase that depends on the amplitude of the torsional oscillations, these signals being applied to a differential amplifier whose output is proportional to the mass flow of the fluid.

12 Claims, 3 Drawing Sheets

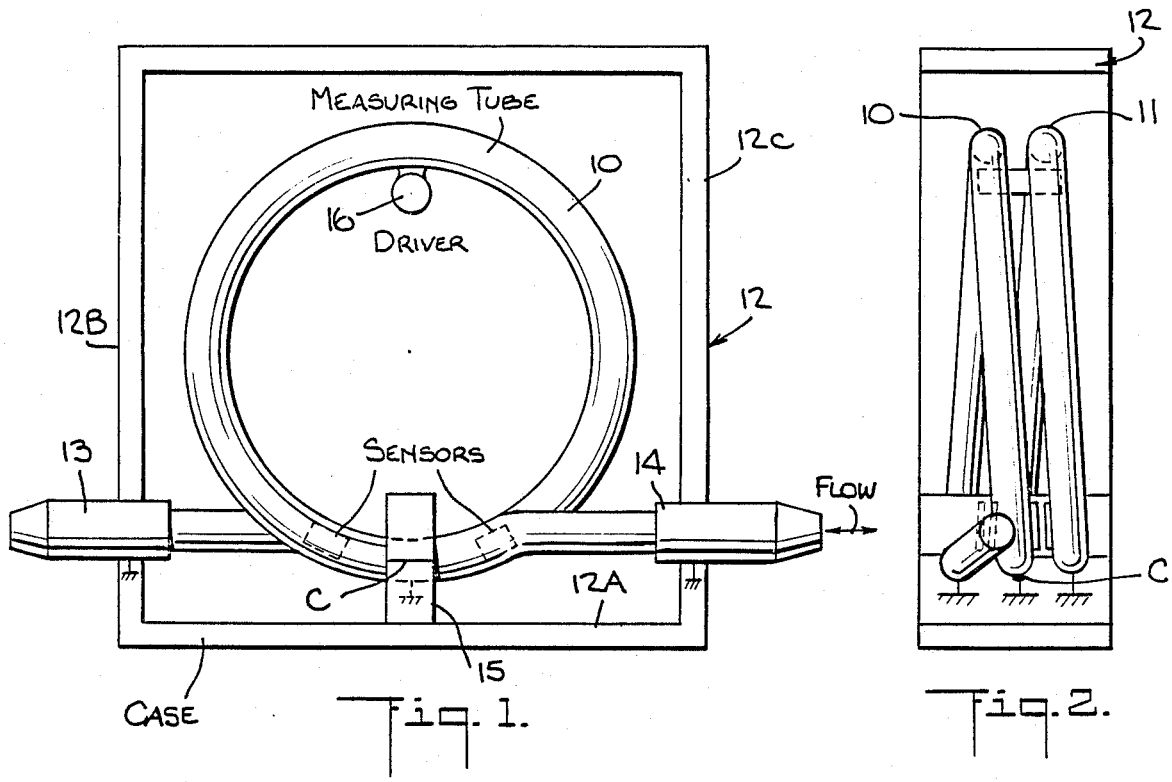
Fig. 1.
Fig. 2.
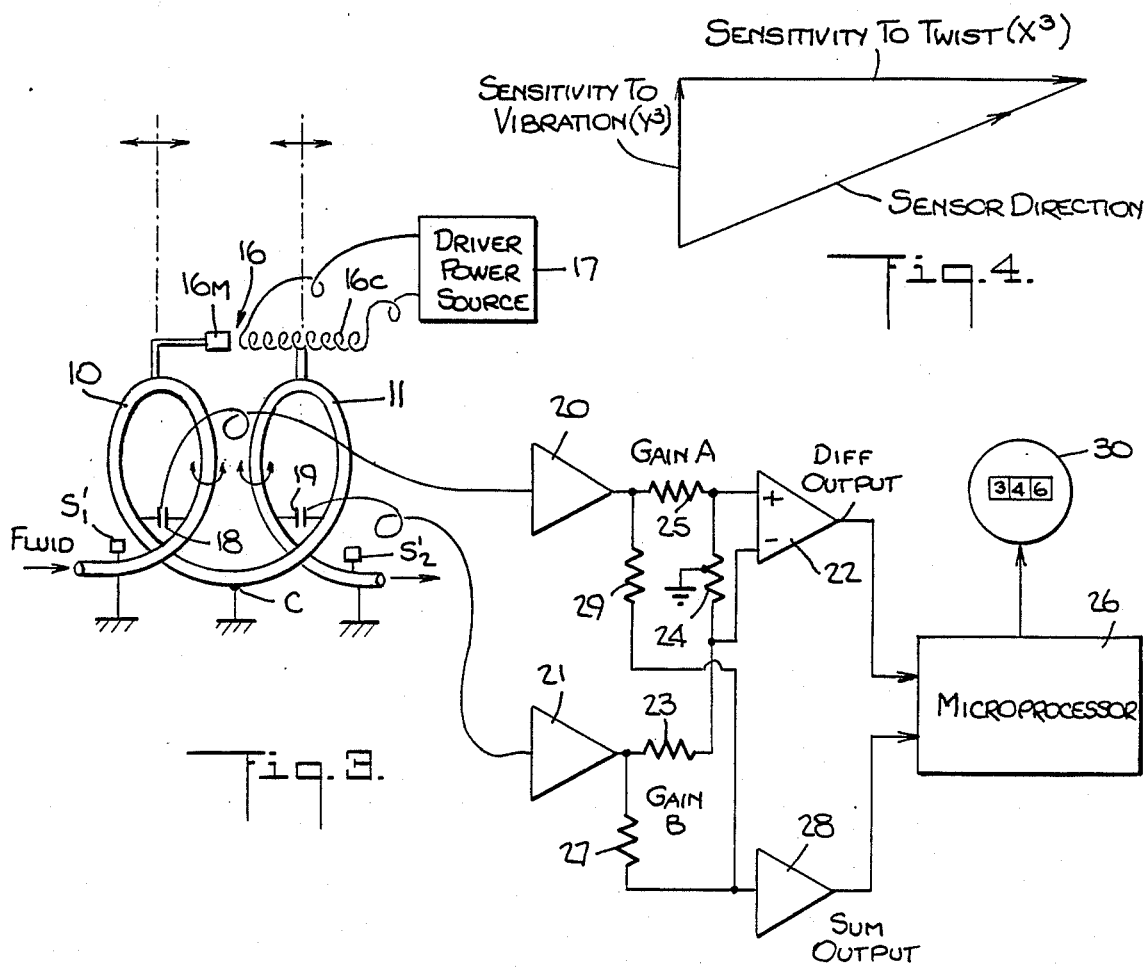
Fig. 3.
Fig. 4.

DOUBLE-LOOP CORIOLIS TYPE MASS FLOWMETER

RELATED APPLICATION

This application is a continuation-in-part of my co-pending application Ser. No. 831,564, filed Feb. 21, 1986, entitled Coriolis Type Mass Flowmeter, now U.S. Pat. No. 4,691,578 whose entire disclosure is incorporated herein by reference.

BACKGROUND OF INVENTION

1. Field of Invention

This invention relates generally to mass flowmeters, and more particularly to a Coriolis-type meter of the doubleloop type in which the loops are so anchored as to define a tuning fork in which the loops on either side of the anchored center which is the junction of the loops are free to vibrate in phase opposition and t torsionally oscillate.

2. Status of Art

A mass flow rate meter is an instrument for measuring the mass of a fluid flowing through a conduit per unit time. Most meters for this purpose measure a quantity from which the mass can be inferred, rather than measuring mass directly. Thus, one can measure the mass flow rate with a volumetric flowmeter by also taking into account pressure, temperature and other parameters to compute the mass.

A Coriolis-type mass flowmeter, which is also called a Coriolis/Gyroscopic meter, provides an output directly proportional to mass flow, thereby obviating the need to measure pressure, temperature, density and other parameters. In this type of meter, there are no obstacles in the path of the flowing fluid, and the accuracy of the instrument is unaffected by erosion, corrosion or scale build-up in the flow sensor.

The theory underlying a Coriolis-type mass flowmeter and the advantages gained thereby are spelled out in the article by K.O. Plache, "Coriolis/Gyroscopic Flow Meter" in the March 1979 issue of Mechanical Engineering, pages 36 to 39.

A Coriolis force is generally associated with a continuously rotating system. Thus, the earth's rotation causes winds from a high pressure region to spiral outwardly in a clockwise direction in the northern hemisphere, and in the counterclockwise direction in the southern hemisphere. And a person moving on a merry-go-round will experience a lateral force and must lean sideways in order to move forward when walking outward along a radius.

A Coriolis force and precession in a gyroscope arise from the same principle. In a gyroscope, when a torque is applied at right angles to the axis of rotor spin, this will produce a precessional rotation at right angles to the spin axis and to the applied torque axis. A Coriolis force involves the radial movement of mass from one point on a rotating body to a second point, as a result of which the peripheral velocity of the mass is caused to accelerate. This acceleration of the mass generates a force in the plane of rotation which is normal to the instantaneous radial movement.

In one known form of Coriolis-type mass flowmeter, the fluid to be metered flows through a C-shaped pipe which, in association with a leaf spring, act as the opposing tines of a tuning fork. This fork is electromagnetically actuated, thereby subjecting each moving particle within the pipe to a Coriolis-type acceleration. The resultant forces angularly deflect or twist the C-shaped pipe to a degree inversely proportional to the stiffness of the pipe and directly proportional to the mass flow rate within the pipe.

The twist of the pipe is electro-optically sensed twice during each cycle of tuning fork oscillation which takes place at the natural resonance frequency of the structure. The output of the optical detector is a pulse whose width is modulated as a function of the mass flow rate. This pulse width is digitized and displayed to provide a numerical indication of mass flow rate.

In the Roth U.S. Pat. No. 3,132,512, a Coriolis-type mass flowmeter is disclosed in which a flow loop vibrating at its resonance frequency is caused to oscillate about a torque axis which varies with fluid flow in the loop. This torsional oscillation is sensed by moving coil transducers.

The Cox et al. U.S. Pat. Nos. 4,127,828 and 4,192,184 show a Coriolis-type meter having two U-shaped flow loops arranged to vibrate like the tines of a tuning fork, torsional oscillation of these loops in accordance with the mass of the fluid passing therethrough being sensed by light detectors. In the Smith U.S. Pat. No. 4,222,338, electromagnetic sensors provide a linear analog signal representing the oscillatory motion of a U-shaped pipe. Electromagnetic sensors are also used in Smith et al., U.S. Pat. No. 4,491,025, in which the fluid whose mass is to be measured flows serially through two parallel U-shaped pipes which together operate as the tines of a tuning fork.

Also of background interest are the following references:

Sipin—U.S. Pat. No. 3,485,098
Smith—U.S. Pat. No. 4,187,721
Smith et at.—U.S. Pat. No. 4,252,028
Dahlin—International patent application No. 85/05677

Because a double-loop Coriolis type meter functions as a tuning fork, much less power is required to oscillate the two loops at their natural frequency than would be required to oscillate one loop alone. When the two loops vibrate as a tuning fork with respect to an anchored center at the junction of the two loops, they will alternately come close together to a minimum spacing and then separate to a maximum spacing; hence the angular velocity vector for one loop will always be opposite to the angular velocity vector for the other loop. And because the flow through the two loops is the same, the loops will be subjected to opposing torques by reason of the opposite angular velocity vectors. As a consequence, the two loops are caused alternately to twist toward and away from each other.

A double-loop tuning fork configuration provides a more stable operation than a single loop mass flowmeter; for as the mass of one loop varies due to increased fluid density, so will the mass of the other loop. This results in a dynamically balanced pair of loops and a substantially decreased sensitivity to external vibratory forces.

However, because the loops of the tuning fork are anchored at their center which is the junction of the two loops as well as the inlet and outlet ends, such anchoring strongly inhibits deflection of the loops. As a result, velocity sensors of the type used in the prior art are not sufficiently sensitive to provide an adequate signal for mass flow measurement.

SUMMARY OF INVENTION

In view of the foregoing, the main object of this invention is to provide a Coriolis-type mass flowmeter of the double-loop type which operates efficiently, reliably and accurately.

More particularly, an object of this invention is to provide a mass flowmeter of the above type which makes use of a double loop that functions as a tuning fork and is excited into vibration at its natural resonance frequency by an electromagnetic driver which is energized in synchronism with the vibrations of the tuning fork.

Also an object of this invention is to provide a mass flowmeter in which the torsional oscillations of the vibrating loops is sensed by a pair of highly sensitive capacitance sensors mounted in symmetrical relation on the two loops.

Briefly stated, these objects are attained in a mass flowmeter of the Coriolis type in which the fluid to be metered is conducted through a pipe which is coiled to form a double loop. The pipe is anchored at its inlet and outlet ends and also at its center which is the junction of the two loops to define a tuning fork in which the identical loops on either side of the anchored center function as tines that are free to vibrate as well as to twist. An electromagnetic driver mounted at the vertex of the double loop is electrically energized to cause the loops to vibrate in phase opposition at the natural frequency of the tuning fork. The fluid passing through the double loop is subjected to Coriolis forces, thereby causing the vibrating loops to torsionally oscillate in accordance with the mass flow of the fluid. Capacitance sensors are symmetrically mounted on the respective loops to yield signals having a difference in magnitude and phase that depends on the amplitude of the torsional oscillations, these signals being applied to a differential amplifier whose output is proportional to the mass flow of the fluid.

BRIEF DESCRIPTION OF DRAWINGS

For a better understanding of the invention as well as other objects and further features thereof, reference is made to the following detailed description to be read in conjunction with the accompanying drawings, wherein:

FIG. 1 is an end view of a double-loop Coriolis type mass flowmeter in accordance with the invention;

FIG. 2 is a side view of the meter;

FIG. 3 schematically illustrates the meter and the measuring circuit associated with the loop capacitance sensors;

FIG. 4 is a vector diagram showing the vectors which determine the sensor displacement;

DESCRIPTION OF INVENTION

Figure 5:
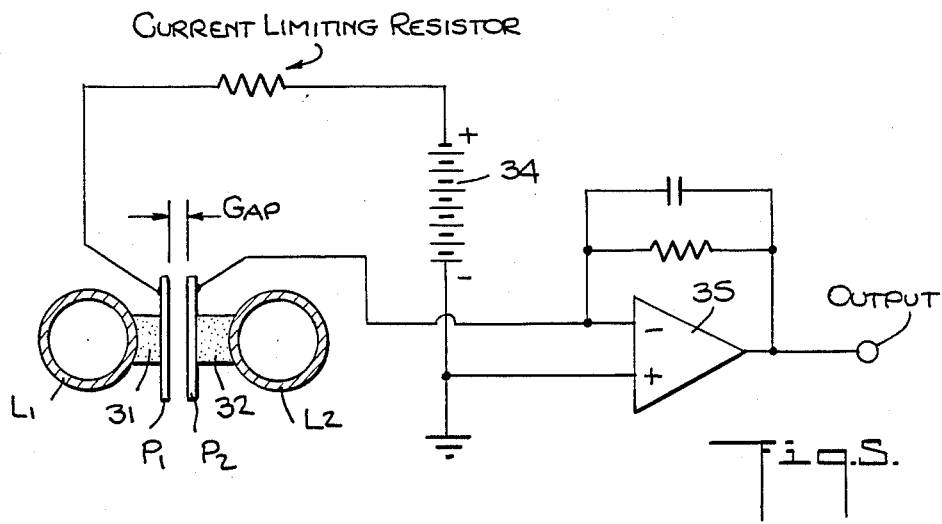
FIG. 5 shows one preferred embodiment of a capacitance loop sensor.

Referring now to FIGS. 1 and 2, there is shown a Coriolis-type mass flowmeter in accordance with the invention which includes a metal pipe of stainless steel or other material that is non-reactive with respect to the fluid being metered and is capable of withstanding fluid pressure. This pipe is coiled to form a double loop constituted by identical circular loops 10 and 11 having the same diameter.

The double loop is supported within a rigid, stationary rectangular case or frame 12 having a base 12A and parallel sides 12B and 12C. Mass flow may be measured in either flow direction in the pipe. But for purposes of illustration, we shall treat fitting 13 coupled to one end of the pipe which passes through an opening in side 12B and is welded thereto as the inlet fitting, and fitting 14 which passes through an opening in side 12C and is welded thereto as the outlet fitting. Hence the inlet and outlet of the double loop pipe are anchored on the frame.

The center C of the double loop which is the junction of loops 10 and 11 is anchored on the frame by a stud 15 which is welded both to base 12A of the double loop center.

The double loop configuration in which the inlet and outlet ends as well as the center are anchored creates a tuning fork whose tines are constituted by identical loops 10 and 11. These are free to vibrate in phase opposition at the natural frequency of the tuning fork. Because the vibrating loops are subjected to opposing Coriolis force torques when a fluid flows therethrough, loops 10 and 11 are caused alternately to twist toward and away from each other.

Mounted at the vertex of the double loop is an electromagnetic driver 16 which is energized by an external alternating power source 17, as shown in FIG. 3, to cause the tuning fork loops to vibrate at a frequency corresponding to the natural resonance of the fork, whereby two loops swing back and forth with respect to the center in phase opposition.

Driver 16, as shown in FIG. 3, may take the form of a permanent magnet 16M cooperating with a coil 16C which is excited by the power source 17 to cause the magnet to be alternately attracted to the coil and to be repelled thereby at a frequency corresponding to the resonance frequency of the tuning Mounted on loop 10 at a point intermediate the anchored center C and a point 45 degrees from the center is a capacitance sensor 18 having a pair of plates, one of which is secured to one leg of the loop and the other to the other leg, the plates of the capacitance sensor being insulated from the metal legs. Likewise, mounted on loop 11 at a corresponding position is a capacitance sensor 19, so that the pair of sensors are symmetrically mounted on the double loop.

The capacitance of a capacitor formed by two conducting plates separated by a dielectric is determined by the equation $$C = \frac{KA}{d}$$

where
  C is the total capacitance
  K is the dielectric constant of the material between the plates (which in the case of the sensors 18 and 19 is air)
  A is the areas of the plates
  d is the distance between the plates In the case of sensor 18, one plate thereof is mounted on the leg of loop 10 which is anchored on center C, and the other plate 19 mounted on the other leg of the same loop anchored at the inlet end 13. The plates of sensor 19 have a corresponding relationship to the legs of loop 11.

Inasmuch as each loop vibrates back and forth and oscillates torsionally, the spacing between the plates of the capacitance sensor varies to an extent determined by the vector resultant of the vibratory and torsional movements. The change in capacitance experienced by each sensor is converted into a corresponding voltage signal by connecting the capacitor to a direct-current voltage source in series with a current limiting resistor, in a manner to be later explained.

The signal voltage sensor 18 is applied to a preamplifier 20 and that from sensor 19 to a pre-amplifier 21. The output of pre-amplifier 21 is connected to the negative input of a differential amplifier 22 through a fixed resistor 23 in series with a variable gain-control resistor 24. The output of pre-amplifier 20 is connected to the positive input of differential amplifier 22 through a fixed resistor 25. The output of differential amplifier 22 which represents the difference between the amplitudes of the sensor signals is applied to a microprocessor 26.

The output of pre-amplifier 21 is also applied through a fixed resistor 27 to the input of a summing amplifier 28 to which is also applied through a fixed resistor 29 the output of pre-amplifier 20. Hence the output of summing amplifier 28 is the sum of the sensor signals, and this is applied to another input of microprocessor 26.

Microprocessor 26, on the basis of the sum and difference signal data entered therein, calculates the mass flow rate of fluid flowing through the flow loop to provide a digital value representing the mass flow rate. This is displayed on visual indicator 30.

The sensitivity of the capacitance sensor to twist varies as the cube of the twist displacement ($X^3$) and its sensitivity to vibratory oscillations varies as the cube of the vibratory displacement ($Y^3$). However, these displacements, which take place concurrently, as shown in the vector diagram in FIG. 4, are at right angles to each other. Hence the actual direction taken by the capacitance sensor is the vector resultant of $X^3$ and $Y^3$. To obtain maximum sensitivity of the capacitance sensor to torsional oscillation—for it is this oscillation that provides a mass flow reading—the ratio of the twist vector to the vibration vector must be such as to provide optimum displacement of the capacitance sensor. This takes place when the sensor is located fairly close to the anchor center C and well below 45 degrees on the loop from this center.

Capacitance Sensors

Figure 6:
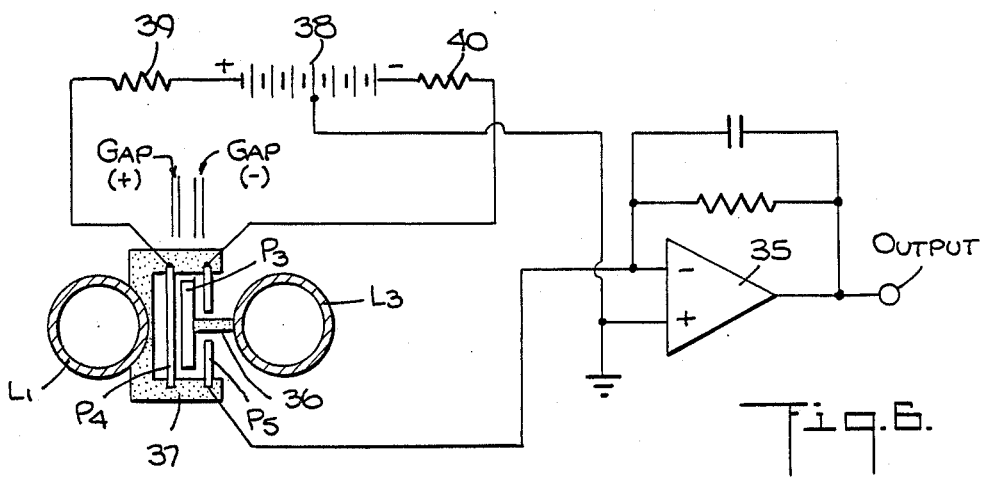
FIG. 6 shows another embodiment of the capacitance loop sensors.

The manner in which a change in capacitance is converted into a change in signal voltage is shown in FIGS. 5 and 6. In the capacitance sensor shown in FIG. 5, the sensor is composed of a pair of metal plates $P_1$ and $P_2$ mounted by insulation pads 31 and 32 on the legs $L_1$ and $L_2$ of one flow loop, so that as the loop is deflected, the air gap between the plates varies accordingly.

Plate $P_1$ is connected through a current limiting resistor 33 to the positive terminal of a dc source 34 whose negative terminal is grounded. Plate $P_2$ is connected to the negative input of an operational amplifier 35 having negative feedback whose positive input is grounded. Hence as the gap between plates $P_1$ and $P_2$ varies as a function of loop deflection, the magnitude of the negative voltage applied to the amplifier varies accordingly.

In the sensor arrangement shown in FIG. 6, one plate $P_3$ is attached by an insulation post 36 to leg $L_2$ of the loop, while attached by an insulation frame 37 to leg $L_1$ is a pair of parallel plates $P_4$ & $P_5$. Plate $P_3$ is interposed between these parallel plates so that when deflection occurs, plate $P_3$ moves closer to plate $P_4$ and away from plate $P_5$ in the reverse direction, depending on the direction of the deflection.

A dc source 38 whose midpoint is connected to the positive input of amplifier 35 which is grounded applied a constant positive voltage relative to ground to plate $P_4$ through current limiting resistor 39 and a constant negative voltage relative to ground to plate $P_5$ through current limiting resistor 40. Hence there is a positive voltage gap between plates $P_3$ and $P_4$ and a negative voltage gap between plates $P_3$ and $P_4$. Plate $p_5$ is connected to the negative input of amplifier 35. Thus, as plate $P_3$ moves toward plate $P_4$, the voltage applied to amplifier 35 becomes more positive, and when it moves toward plate $P_5$, the applied voltage becomes more negative.

Figure 7:
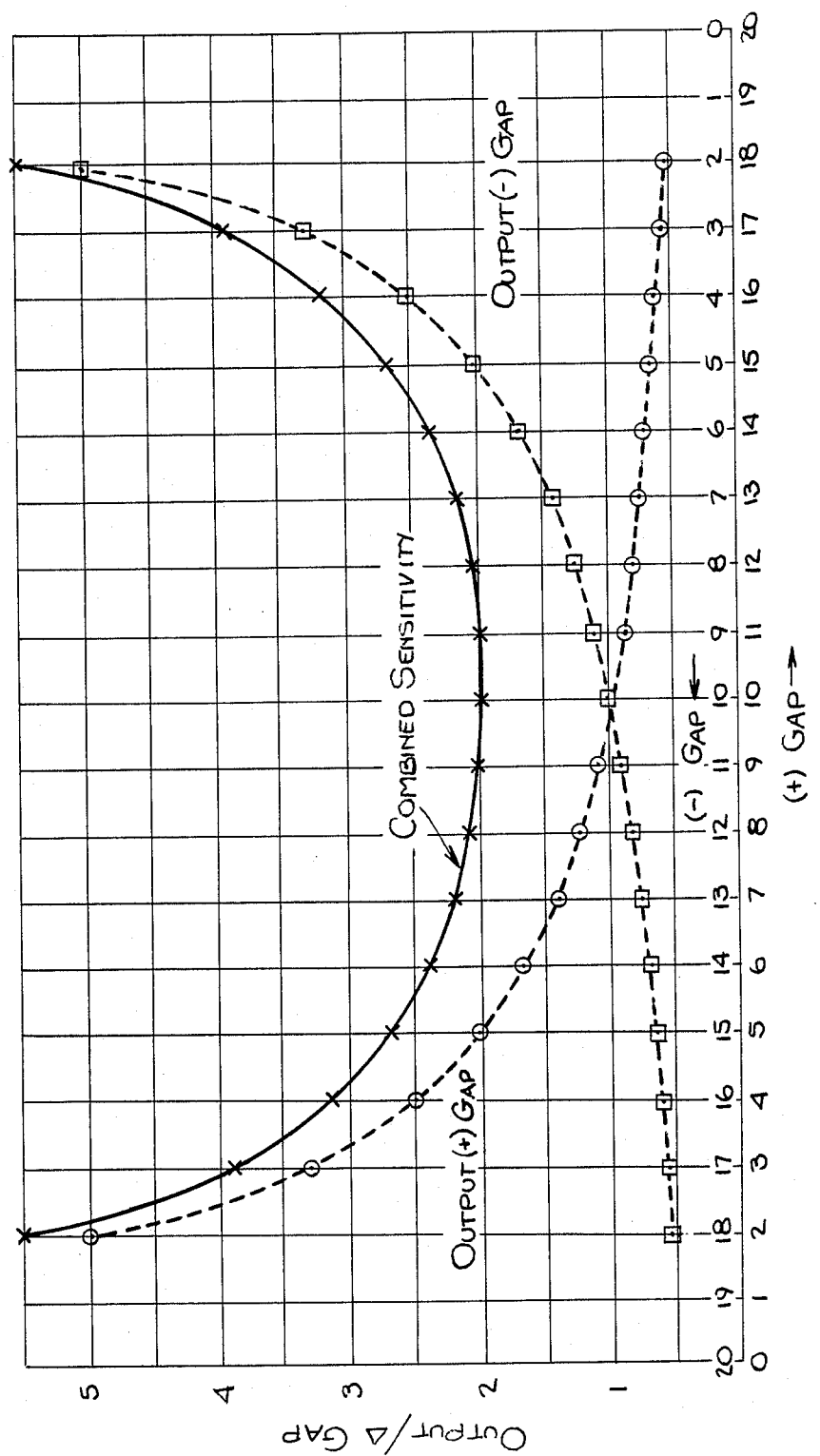
FIG. 7 is a graph showing the combined sensitivity of the loop sensors.

FIG. 7 graphically shows the combined sensitivity of a sensor having a (+) gap and a sensor having a (−) gap. It will be seen that on a capacitive gap scale of 0 to 20, the output of the (+) gap goes from a point below 1 to 5, while the output of the (−) gap, which is the inverse of the (+) gap on the same scale, goes from a point below 1 to 5. However, as is evident in the graph, the combined sensor sensitivity produces a significantly higher output throughout the scale range.

Driver Excitation

Figure 8:
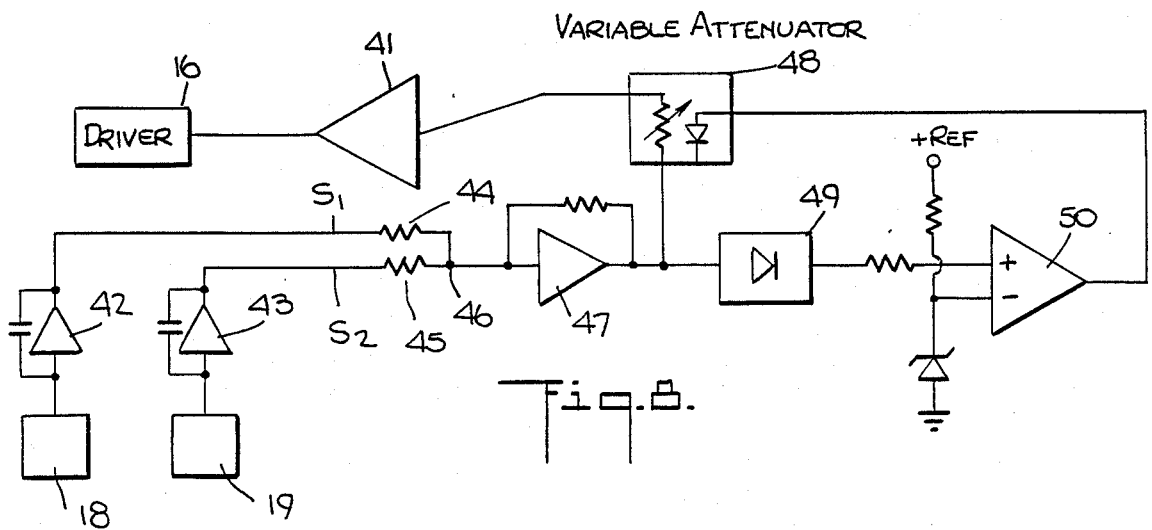
FIG. 8 is a block diagram showing the circuit for energizing the loop driver in synchronism with the combined outputs of the sensors.

A preferred arrangement for supplying alternating power to driver 16 for the double-loop flowmeter is shown in FIG. 8 in which power is supplied to driver 16 by a power amplifier 41 so that the double loop tuning fork is excited into vibration at a frequency that corresponds to the natural frequency of the tuning fork.

For this purpose, the capacitance sensors 18 and 19 symmetrically mounted on the loops in the manner previously described are connected to amplifiers 42 and 43, respectively, whose outputs are applied through resistors 44 and 45 to a summing junction 46 so that the sensor outputs $S_1$ and $S_2$ are additively combined. The combined signal voltage ($S_1$ and $S_2$) at junction 46 is applied to the input of amplifier 47 whose output is applied through a variable attenuator 48 to the input of power amplifier 41. The output of the combined signal voltage amplifier 47 is also applied through a rectifier 49 to the positive input of a comparator amplifier 50 to whose negative input is applied a positive reference voltage.

Amplifier 50 compares the rectified output of amplifier 47 with the voltage reference to yield an error signal that depends on the difference therebetween. The error signal appearing in the output of amplifier 50 is applied to variable attenuator 48 and acts to so vary the power produced by power amplifier 41 to drive the tuning fork into vibration as to cause the rectified output of sensor voltage signal amplifier 47 to become equal to the reference voltage.

Hence the sum of the voltage signals produced by sensors 18 and 19 now becomes fixed. The double loop tuning fork is self-starting and is excited at its resonance frequency.

While there has been shown and described a preferred embodiment of a double-loop Coriolis type flowmeter in accordance with the invention, it will be appreciated that many changes and modifications may be made therein without, however, departing from the essential spirit thereof.

Thus, instead of a double-loop of the type shown in which the two loops are in series relationship, in practice the double loop may be constituted by a pair of loops in parallel relationship. And to further increase the ratio of the twist vector to the vibration vector to enhance the sensitivity of the capacitance sensors to torsional oscillation, the sensors may be located closer to the inlet and outlet of the pipe as shown by $S'_1$ and $S'_2$ in FIG. 3 which represents an alternative to sensors 18 and 19 shown in the figures.

I claim:

1. A mass flow flowmeter of the Coriolis type comprising:

A a pipe having an inlet and an outlet end coiled to form a double loop having identical circular loops;
   B a stationary frame for supporting the double loop to anchor said pipe at the inlet end and at the outlet end and at its center which is the junction of the two loops to define a tuning fork in which the identical loops on either side of the center function as tines that are free to vibrate back and forth with respect to the center as well as to twist;
   C an electromagnetic driver mounted at the vertex of the double loop, the driver when electrically energized causing the loops to vibrate in phase opposition at the natural frequency of the tuning fork;
   D means to conduct the fluid through the pipe from the inlet to the outlet end thereof, thereby subjecting the double sionally oscillate in accordance with the mass flow of the fluid;
   E a pair of capacitance sensors symmetrically mounted the respective loops in either side of the center whereby in
   signals of different magnitude as a function of mass flow; and
   F means to supply the signals from the sensors to a differential amplifier whose output is substantially proportional to the mass flow rate.

2. A flowmeter as set forth in claim 1, wherein each loop has a generally circular formation and each sensor is mounted on its loop at a position intermediate said center and 45 degrees from the center.

3. A flowmeter as set forth in claim 1, wherein said loop is supported, said case having a base and a pair of parallel sides, said center being anchored on said base, said inlet and
   ends extending through and being anchored on said sides.

4. A flowmeter as set forth in claim 3, wherein said inlet and outlet ends are provided with fittings that go through said sides of the case and are welded thereto.

5. A flowmeter as set forth in claim 1, wherein each loop is defined by one arcuate leg extending from an anchored end of the pipe and in an other arcuate leg extending from the anchored center, each sensor being formed by one plate mounted the plates being spaced by a gap which varies as a function of the torsional oscillation of the loop.

6. A flowmeter as set forth in claim 5, wherein one plate of the sensor is connected through a current-limiting resistor to the positive side of a d-c source whose negative side is connected to the positive input of an operational amplifier, the negative input of which is connected to the other plate of the sensor, whereby the varying capacitance of the sensor is converted into a signal voltage which appears in the output of the amplifier.

7. A flowmeter as set forth in claim 1, wherein each loop is defined by one arcuate leg extending from an anchored end of the pipe and an other arcuate leg extending from the anchored center, each sensor being formed by a pair of parallel plates supported in an insulating frame secured to said one leg and a single plate interposed between the parallel plates and supported by an insulation peg secured to the other leg, whereby ternately to move toward one of the parallel plates or toward the other plate to vary the gaps therebetween.

8. A flowmeter as set forth in claim 7, further including a d-c voltage source whose midpoint is connected to the positive input of an operational amplifier and whose positive and negative poles on either side of the midpoint are connected to the parallel plates, one of which is connected to the negative input of the amplifier.

9. A flowmeter as set forth in claim 1, wherein the outputs of said sensors are additively combined to provide an input signal, and said driver is energized by a power amplifier to whose input the input signal is applied through a variable attenuator which is varied in accordance with an error signal derived by comparing the input signal with a reference voltage, thereby causing the double loop to be driven in a manner whereby the input signal equals the reference voltage.

10. A flowmeter as set forth in claim 1, wherein said double loop is formed by a pair of loops in series relationship.

11. A flowmeter as set forth in claim 1, wherein said double loop is formed by a pair of loops in parallel relationship.

12. A flowmeter as set forth in claim 1, wherein one sensor is mounted adjacent said inlet and the other is mounted adjacent said outlet.

* * * * *

UNITED STATES PATENT OFFICE
CERTIFICATE OF CORRECTION

PATENT NO. : 4,747,312

DATED : May 31, 1988

INVENTOR(S) : Peter J. Herzl

It is certified that error appears in the above-identified patent and that said Letters Patent are hereby corrected as shown below:

Column 7, line 29, after "double" delete "sionally" and insert --loop to Coriolis forces causing the vibrating loops to torsionally--

Column 7, line 33, after "in" insert --the absence of flow, the sensors yield equal signals and during flow--

Column 7, line 43, after "said" insert --frame is formed by a rectangular case within which the double--

Column 7, line 46, after "and" insert --outlet--

Column 8, line 5, after "mounted" insert --on said one leg and an other plate mounted on said other leg,--

Column 8, line 24, after "whereby" insert --torsional oscillation of the loop causes the single plate alternately--

UNITED STATES PATENT AND TRADEMARK OFFICE
CERTIFICATE OF CORRECTION

PATENT NO. : 4,747,312                     Page 2 of 2

DATED : May 31, 1988

INVENTOR(S) : Peter J. Herzl

It is certified that error appears in the above-identified patent and that said Letters Patent is hereby corrected as shown below:

Column 8, line 25, delete "ternately"

Signed and Sealed this

Eighteenth Day of October, 1988

*Attest:*

DONALD J. QUIGG

*Attesting Officer*       *Commissioner of Patents and Trademarks*